Patented Sept. 9, 1924.

1,507,820

UNITED STATES PATENT OFFICE.

ADINO F. FILES, OF MAUMEE, OHIO.

POWDERED BUTTER-COLORING MATERIAL FOR OLEOMARGARINE AND BUTTER.

No Drawing. Application filed November 7, 1921. Serial No. 513,298.

*To all whom it may concern:*

Be it known that I, ADINO F. FILES, a citizen of the United States, and a resident of Maumee, in the county of Lucas and State of Ohio, have made an invention appertaining to Powdered Butter-Coloring Material for Oleomargarine and Butter; and I do hereby declare the following to be a full, clear, and exact description of the invention, such as will enable others skilled in the art to which it appertains to make and use the same.

My invention has for its object to provide efficient coloring materials for oleomargarine and the like that may be dispensed and handled in dry form. The invention particularly has for its object to provide an intense dry coloring material for oleomargarine whereby the oleomargarine may be readily given the color of butter.

Ordinarily an oily coloring material is given or sold with oleomargarine. The coloring material is ordinarily contained in bottles or capsules and by careful manipulation the oily coloring liquid is worked into the butter. Usually a capsule containing the oily coloring material is sold or given upon the sale of each pound of oleomargarine, a sufficient amount of coloring oil being sold or given with each pound of oleomargarine to give the pound a butter color when it is worked into the oleomargarine. Usually about one-fourth of a dram of colored oil is given or sold with each pound of oleomargarine to give the proper color.

By my invention I have provided a dry coloring material which can be readily handled, dispensed in paper packages, readily distributed over the oleomargarine, as by sprinkling or otherwise, and readily worked into the oleomargarine to produce the butter color. Moreover by my invention I accomplish the same and better results than are accomplished by the colored oil now commonly used and with materials that are very much cheaper. In forming the coloring material I use aniline dyes known as benzeneazo-b-naphthylamine and orth-tolueneazo-b-naphthylamine, and also indicated by yellow A. B. and O. B. respectively. These dyes are mixed in the proportion of one of A. B. and nine of O. B. to accomplish the best results. The proportions however may be varied to vary the tint that may be produced. If desired, vegetable coloring materials may be used in sufficient amounts to produce the desired intensity of color in the oil. To ten grains of the dye mixture I add one-eighth dram of refined peanut oil. Any suitable oil, however, may be used in place of refined peanut oil, such as cottonseed oil, preferably the refined cottonseed oil, olive oil, refined linseed oil, and vegetable oils of different kinds. If desired, mineral oils may also be used. The oil and coloring matter are thoroughly mixed together in any quantities in the proportion of one-fourth dram to ten grains of coloring material while it is being thoroughly heated in a water bath. The mixing and heating may proceed for about twenty minutes. Preferably when the mixture has cooled I add starch in the proportion of one hundred and ninety grains of the powdered starch to one-fourth dram of the oil and ten grains of the coloring materials, and thoroughly mix the starch with the oil mixture by trituration. Preferably I use refined corn starch. Starch of any form or from any source, however, may be used. Also under certain circumstances flour and glutens may be used. Carbonate of magnesia may also be used if desired. I preferably use only enough starch to absorb all of the oil. This forms a colored powdered material that can be sub-divided and used in powdered form at any time. The powdered material thus formed is sub-divided and wrapped as powders are commonly wrapped, four grains to a powder, which is sufficient to color one pound of oleomargarine. These powders are wrapped in paper and are very convenient for use and when worked into the oleomargarine give an excellent butter color.

Any quantity of the A. B. and O. B. coloring materials may be used, from one of A. B. to nine of O. B. to nine of A. B. to one of O. B., which however varies the tint. The quantity of the oil used will depend upon the character of the oil and may be varied from one-tenth dram to one-half dram when ten grains of the coloring material is used. The amount of starch may be varied and it may be used from one-hundred grains to three-hundred grains of starch to ten grains of the coloring material used. This likewise will alter the intensity of the color and will furthermore vary the absorbent condition or concentration of the oil. If too little starch is used in proportion to the amount of oil it will cause an oily condition of the wrapper or paper. Preferably sufficient starch is used to practically absorb all of the oil and prevent it from being absorbed by the paper to a material degree. The amount of the starch used will likewise depend upon the character of the starch. Likewise if flour or other glutens or carbonate of magnesia are used in place of the starch the amount used will be varied, the amount of the starch, flour or magnesia preferably used being just sufficient to absorb all of the oil. Mixtures of two or more of the oils may be used and likewise mixtures of the starches, flour, glutens or carbonate of magnesia in any proportion or any number of the said materials may be used in place of the refined corn starch.

I claim:

1. A dry coloring material for oleomargarine and the like, consisting of aniline colored oil and sufficient starch to absorb substantially all of the colored oil.

2. A dry coloring material for oleomargarine and the like, consisting of colored oil and starch mixed in the proportion of one-tenth to one-half a dram of oil colored with ten grains of aniline colors and about one-hundred and ninety grains of starch.

3. A dry coloring material for oleomargarine and the like, consisting of colored oil and starch mixed in the proportion of one-sixth dram of refined oil, like peanut oil and cottonseed oil, colored with ten grains of aniline colored materials and about one-hundred and ninety grains of corn starch.

In testimony whereof, I have hereunto signed my name to this specification.

ADINO F. FILES.